C. VIGNAL.
Refrigerator.
No. 105,521.  Patented July 19, 1870.
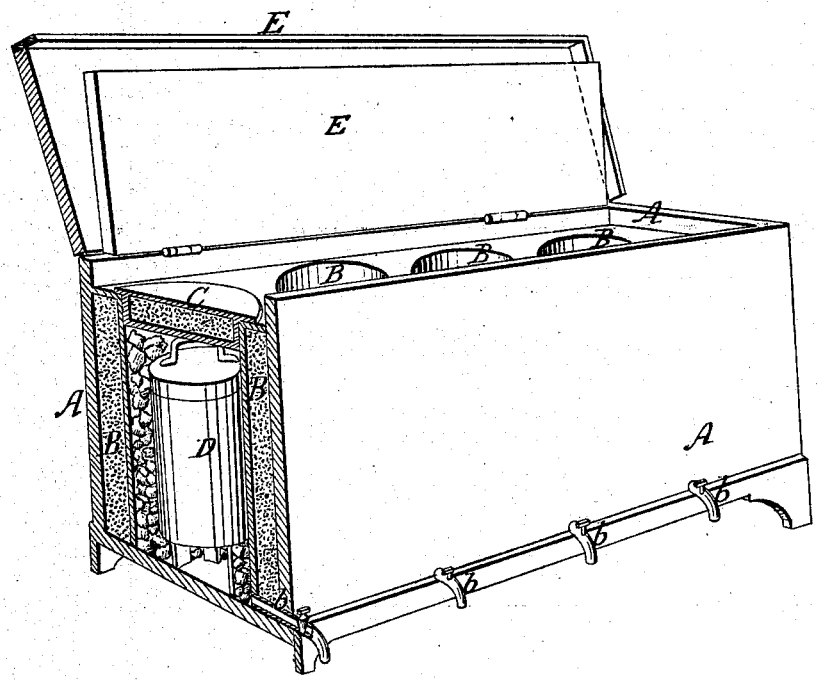

United States Patent Office.

CARL VIGNAL, OF NEW YORK, N. Y.

Letters Patent No. 105,521, dated July 19, 1870.

IMPROVED ICE-CREAM REFRIGERATOR.

The Schedule referred to in these Letters Patent and making part of the same.

*To all whom it may concern:*

Be it known that I, CARL VIGNAL, of the city of New York, in the county and State of New York, have invented a new and Improved Ice-cream Refrigerator; and I do hereby declare that the following is a full, clear, and exact description thereof, which will enable others skilled in the art to make and use the same, reference being had to the accompanying drawing forming part of this specification.

The drawing represents a perspective view, partly in section, of my improved refrigerator.

This invention relates to a new apparatus for making and keeping ice-cream, and consists in the use of a box, constructed of non-conducting material, and provided with a series of vertical cylindrical openings, in which the various flavors of ice-cream can be prepared and kept for use.

Ice-cream is at present made by revolving the cases that contain the cream in tubs or pails of sheet-metal or other heat-conducting material. In these outer vessels the ice used in the preparation of the cream will quickly melt and be wasted. For large hotels and establishments in which several kinds of ice-cream must be kept in good condition almost continually, the ordinary devices are almost useless.

My improved refrigerator, A, is made in form of a box, of wood or other material, and contains four, more or less, vertical cylinders, B B, which may be made of galvanized iron or other non-corrosive material. The spaces between and around these cylinders B are filled with charcoal or other non-conducting material. The covers C of the cylinders are also filled with non-conducting material, as indicated at *a*, in the drawing.

A pipe, *b*, carrying a faucet, projects from the lower part of each cylinder B, through the side of the box A, for the purpose of discharging the dissolved ice.

Into each cylinder B is or can be placed an ice-cream freezer, D, of suitable construction, with ice and salt or other freezing mixture packed around it. When the ice-cream has been prepared the cylinders are closed by the covers C and the top of the box A by the double wooden lids E E, so that the frozen mixture may retain its temperature for as long a time as possible.

Having thus described my invention,

I claim as new and desire to secure by Letters Patent—

The ice-cream refrigerator, containing the cylinders B, which are surrounded with non-heat-conducting material, substantially as set forth.

CARL VIGNAL.

Witnesses:
GEO. W. MABEE,
ALEX. F. ROBERTS.